(12) United States Patent
Bøllund et al.

(10) Patent No.: US 11,034,606 B2
(45) Date of Patent: Jun. 15, 2021

(54) METHOD AND AN APPARATUS FOR MAKING A MINERAL MELT

(71) Applicant: Rockwool International A/S, Hedehusene (DK)

(72) Inventors: Lars Bøllund, Slangerup (DK); Lars Elmekilde Hansen, Roskilde (DK)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 229 days.

(21) Appl. No.: 15/213,639

(22) Filed: Jul. 19, 2016

(65) Prior Publication Data
US 2016/0326039 A1 Nov. 10, 2016

Related U.S. Application Data

(63) Continuation of application No. 13/819,947, filed as application No. PCT/EP2011/064984 on Aug. 31, 2011, now abandoned.

(30) Foreign Application Priority Data

Sep. 1, 2010 (EP) .................................. 10174859

(51) Int. Cl.
  *C03B 5/16* (2006.01)
  *C03B 5/12* (2006.01)
  *C03B 3/02* (2006.01)

(52) U.S. Cl.
  CPC ............... *C03B 5/16* (2013.01); *C03B 3/023* (2013.01); *C03B 5/12* (2013.01)

(58) Field of Classification Search
  CPC .. C03B 3/023; C03B 5/12; C03B 5/16; C03B 5/167
  See application file for complete search history.

(56) References Cited

U.S. PATENT DOCUMENTS 1,705,449 A  3/1929 Howard
1,888,290 A * 11/1932 Rhinow .................. F23L 17/02
  454/12
(Continued)

FOREIGN PATENT DOCUMENTS

CA  2269449 A1  10/2000
EP  0447802 A2  9/1991
(Continued)

OTHER PUBLICATIONS

Pyroflux Process Glass Production Economic Estimates (1992) Boletin de la Sociedad Espanola de Ceramica y Vidro, vol. 31—No. 3. pp. 256-257.*

*Primary Examiner* — John M Hoffmann
(74) *Attorney, Agent, or Firm* — Dinsmore & Shohl LLP (57) ABSTRACT

An apparatus for the production of a mineral melt burns combustible material in the presence of inorganic material to form a melt. The apparatus includes a circulating combustion chamber which receives a fuel, pre-heated mineral material and a combustion gas so as to melt the mineral material and generate exhaust gases which are separated from the melt. The gases pass through an exhaust pipe to a conduit of a heat exchange system. The apparatus includes a quenching hood for quenching the exhaust gases by drafting a cooling fluid, such as ambient air, into the flow of exhaust gases around the exhaust pipe, and wherein the exhaust gases exit the exhaust pipe inside the hood.

6 Claims, 2 Drawing Sheets

(56) References Cited

U.S. PATENT DOCUMENTS

| | | | | |
|---|---|---|---|---|
| 1,982,031 A | * | 11/1934 | Stark | 126/116 A |
| 3,191,583 A | | 6/1965 | Petritsch et al. | |
| 3,236,045 A | * | 2/1966 | Berger | F01N 3/02 |
| | | | | 60/311 |
| 3,332,676 A | * | 7/1967 | Namy | C21C 5/32 |
| | | | | 266/157 |
| 4,113,459 A | | 9/1978 | Mattmuller | |
| 4,248,615 A | | 2/1981 | Seng et al. | |
| 4,248,616 A | | 2/1981 | Seng et al. | |
| 4,290,793 A | * | 9/1981 | Brockway | C03C 21/00 |
| | | | | 65/114 |
| 4,298,369 A | | 11/1981 | Froberg et al. | |
| 4,337,892 A | | 7/1982 | Diermayer et al. | |
| 4,406,396 A | * | 9/1983 | Habegger | F23N 3/002 |
| | | | | 126/293 |
| 4,425,868 A | * | 1/1984 | Shapiro | C03C 17/005 |
| | | | | 118/314 |
| 4,944,785 A | | 7/1990 | Sorg et al. | |
| 5,123,942 A | * | 6/1992 | Argent | C03B 3/00 |
| | | | | 65/135.9 |
| 5,143,534 A | * | 9/1992 | Kilner | C03B 19/1025 |
| | | | | 264/15 |
| 5,273,566 A | | 12/1993 | Balcar et al. | |
| 5,359,947 A | * | 11/1994 | Wagner | F23G 7/04 |
| | | | | 110/214 |
| 5,399,181 A | * | 3/1995 | Sorg | C03B 3/023 |
| | | | | 65/136.1 |
| 5,709,728 A | | 1/1998 | Fleckenstein et al. | |
| 5,979,191 A | * | 11/1999 | Jian | C03B 3/02 |
| | | | | 432/100 |
| 2003/0024271 A1 | * | 2/2003 | Simpson | C03B 5/193 |
| | | | | 65/134.4 |
| 2005/0172677 A1 | | 8/2005 | Jensen et al. | |

FOREIGN PATENT DOCUMENTS

| | | |
|---|---|---|
| FR | 2888314 A1 | 1/2007 |
| GB | 1601329 A | 10/1981 |
| GB | 2161593 A | 1/1986 |
| JP | 03152306 B2 | 4/2001 |
| WO | 2009118180 A1 | 10/2009 |

\* cited by examiner

METHOD AND AN APPARATUS FOR MAKING A MINERAL MELT

CROSS-REFERENCE TO RELATED APPLICATIONS

This application is a continuation of U.S. patent application Ser. No. 13/819,947 filed Mar. 28, 2013, which is the U.S. National Phase of PCT/EP2011/064984 filed Aug. 31, 2011, which claims priority of European Patent Application 10174859.8 filed Sep. 1, 2010.

FIELD OF THE INVENTION

The present invention relates to an apparatus and method for the production of a mineral melt by burning combustible material in the presence of inorganic particulate material and thereby forming a melt. The melt can then be fiberised to form mineral fibres or used in other industrial processes.

BACKGROUND OF THE INVENTION

Traditionally, the normal way of producing a melt for slag, stone or rock fibres has been by means of a shaft furnace in which a self-supporting stack of inorganic particulate material is heated by combustion of combustible material in the furnace. The stack gradually melts and is replenished from the top, with melt draining down the stack and out from the bottom of the furnace. The normal furnace for this purpose is a cupola furnace.

It is necessary for the stack to be self-supporting and permeable to the combustion gases, which are generally generated by combustion of carbonaceous material in the stack. It is therefore necessary that everything in the stack is relatively coarse (in order that the stack is permeable) and has high physical strength and does not collapse until combustion or melting is well advanced. In practice this means that the carbonaceous material is coke and the particulate material is either coarsely crushed rock, stone or slag.

If fine particles of mineral material such as waste mineral wool are used it is necessary to incur the expense and inconvenience of forming it into briquettes. Briquetting usually uses sulphur-containing materials as binder, such as Portland cement with gypsum, and this means that the effluent is liable to have a high sulphur content, which has to be treated. The cupola or other stack furnace system also has the disadvantage that conditions in the furnace always tend to be sufficiently reducing that some of the iron is reduced to metallic iron. This necessitates separating metallic iron from the melt, reduces wool production, leads to the provision of iron waste and also tends to incur the risk of corrosion in the section containing iron and slag. Another disadvantage is that the process does not have high thermal efficiency.

Despite these disadvantages, the process using a cupola or other stack furnace has been widely adopted throughout the world for the manufacture of rock, stone or slag fibres. An alternative and entirely different system for the production of a mineral melt that avoids or reduces the disadvantages of the cupola system is disclosed in our earlier publication WO 03/002469. This system involves suspending powdered coal, or other fuel, in preheated combustion air and combusting the suspended fuel in the presence of suspended particulate mineral material in a circulating combustion chamber, i.e., a combustion chamber in which the suspended particulate materials and air circulate in a system which is or approaches a cyclone circulation system. This is commonly referred to as a cyclone furnace. The suspension of coal in preheated air, and the particulate mineral material, are introduced through the top or close to the top of the combustion chamber. Within the combustion chamber, combustion of the particulate coal occurs and the particulate material is converted to melt. The melt and particulate material that is not yet melted is thrown onto the walls of the chamber by the circulating gases and will flow down the chamber. The melt is collected in a settling tank at the bottom of the chamber.

In order to increase the energy efficiency of the cyclone furnace in WO 03/002469, the exhaust gases, which leave the circulating chamber at a temperature in the range of 1400 to 1700° C., are used to preheat the particulate material. WO 03/002469 teaches that the exhaust gases are quenched to 1000 to 1500° C. and then mixed with the mineral material to preheat it to a temperature of 700 to 1050° C.

WO 2009/118180, WO 2008/019780, WO 2008/086990, WO 2009/090040 and WO 2008/086991 also disclose a cyclone system for making a mineral melt.

The cyclone furnace has significant advantages compared to cupola or other stack furnaces. With respect to fuel, it avoids the need for briquetting fine particles and a wide range of fuels can be used including, for example, plastic. Using a melting cyclone furnace eliminates the risk of reduction of the ores to iron and releases exhaust gases which are environmentally acceptable. The flexibility in melt capacity is much better than with a cupola furnace meaning that production can easily and quickly be switched, from, for example, 40% to 100% of total capacity so the time taken to respond to changing demands is greatly reduced. Furthermore, melting in a cyclone furnace is much quicker than is the case for a cupola furnace and is in the order of minutes, rather than in the order of hours.

Hence, using a melting cyclone furnace system is economically and environmentally desirable and the systems disclosed in the above-mentioned documents work well. There is, however, room for improvement in the process.

During operation of the melting circulating combustion chamber all raw materials supplied to the cyclone furnace should ideally be melted and thrown onto the wall and collected at the base of the melting cyclone. However, in practice some light material, such as small droplets and fines, becomes suspended in the exhaust gases and leaves the cyclone furnace together with the hot exhaust gases through the central exhaust pipe. The exhaust gases are very hot and need to be cooled before they are processed further in the system. This is done by quenching, i.e. supply of air or another cooling gas at a quenching point, immediately after leaving the melting cyclone. Some of the droplets and fines solidifies or agglomerates when it reaches the quenching point and due to the rotational movement of the material some of it is thrown outwards and falls down onto the outside roof of the combustion chamber. The material then accumulates on the outside of the furnace which may be hazardous since the material is very hot. This is highly undesirable and should be avoided.

On this background, it is an object of the present invention to provide a method and an apparatus for avoiding discharge of material to the outside of the furnace cyclone and the heat exchange system.

SUMMARY OF THE INVENTION

According to a first aspect, the present invention provides a method of making a mineral melt, the method comprising the steps of providing a circulating combustion chamber; injecting fuel, particulate mineral material and combustion gas into the circulating combustion chamber; combusting the fuel in the circulating combustion chamber thereby melting the mineral material to form a mineral melt and generating exhaust gases; separating the exhaust gases from the mineral melt, collecting the mineral melt and passing the exhaust gases upwards through an exhaust pipe to a conduit of a heat exchange system; and quenching the exhaust gases before entering the conduit by drafting a cooling fluid, such as ambient air, into the flow of exhaust gases around the exhaust outlet, wherein the exhaust pipe extends upwards from the combustion chamber at a height of at least 2.5 times, preferably between 2.5 and 4, more preferably approximately three times, the inner diameter of the exhaust pipe and into the quenching hood so that the exhaust gases exit the exhaust pipe inside the hood.

According to a second aspect of the invention, an apparatus is provided for the production of a mineral melt by burning combustible material in the presence of inorganic particulate material and thereby forming a melt, wherein the apparatus comprising: a circulating combustion chamber receiving a supply of a fuel, pre-heated mineral material and a combustion gas and combusting the fuel in the circulating combustion chamber thereby melting the mineral material to form a mineral melt and generating exhaust gases, wherein the exhaust gases are separated from the mineral melt and the exhaust gases are passed upwards through an exhaust pipe to a conduit of a heat exchange system; and quenching means for quenching the exhaust gases at the exhaust pipe, wherein the quenching means comprises a quenching hood for quenching the exhaust gases before entering the conduit by drafting a cooling fluid, such as ambient air, into the flow of exhaust gases around the exhaust outlet, and wherein the exhaust pipe extends upwards from the combustion chamber at a height of at least 2.5 times, preferably between 2.5 and 4, more preferably approximately three times, the inner diameter of the exhaust pipe and into the quenching hood so that the exhaust gases exit the outlet inside the hood.

The hot exhaust gas is circulating during its exit through the exhaust pipe due to the rotational movement in the cyclone furnace. According to the invention, the exhaust pipe is higher than normal so that a major part of the light material in form of droplets and fines are thrown onto the inner surface of the exhaust pipe as melt and then runs down into the melting cyclone and becomes part of the melt therein. These droplets of mineral material melt are thus not cooled so that they solidify inside the exhaust pipe.

The height of the exhaust pipe ensures that many of the droplets and fines from the hot exhaust gas are thrown onto the wall of the exhaust pipe and returned to the melting cyclone. Previously, the height of the exhaust pipe before quenching would be low in order to save costs for expensive linings and other materials that can withstand the high temperatures in this area. However according to the invention when melting fine mineral materials, it was advantageous to have a higher exhaust pipe due to the amount of droplets and fines leaving with the exhaust gases.

The exhaust pipe may be provided with an inner diameter of approx. 850 mm and the height of the exhaust pipe may be approx. 250-300 cm. By having a sufficiently large ratio between the inner diameter and the height of the exhaust pipe, a large portion of the small droplets of melt may be subjected to inner surface impact and thereby removed from the hot exhaust gas flow.

In a cyclone furnace according to the invention, the exhaust gases leave the circulating combustion chamber at a temperature of between 1300 and 1900° C., usually 1500 to 1750° C., such as around 1550 to 1650° C., and they are then quenched to a temperature of from 1000 to 1500° C., such as around 1300° C. Hereby, softening or melting the mineral material later introduced into the conduit is avoided. The quenching is carried out with any suitable gas such as air or any suitable liquid such as ammonia. In a preferred embodiment, ambient air is used.

In the preferred embodiment of the invention, the step of quenching is performed by a quenching hood which comprises an annular air intake opening around the exhaust pipe. This provides a uniform quenching around the outlet opening of the exhaust pipe.

In order to prevent larger particulates of material from exiting the system radially, the exhaust pipe may be screened by a perforated screening element where the exhaust gases exit the pipe. This screen may not only retain any larger particles which are thrown up from the melt in the furnace from being discharged through the quenching, but does also prevent raw pre-heated material particles which are introduced into the conduit above the quenching hood from falling out of the system, but rather into the melting furnace if they cannot be carried by the exhaust gases.

Preferably, the exhaust pipe has a larger diameter ($D_1$) than the diameter ($D_2$) of at least the inlet portion of conduit. This may be advantageous since any residues forming on the inner surface of the conduit then fall into the melt and not outside the furnace when they are released. In the upwardly directed exhaust gas draft the light materials and droplets until a certain size will be suspended in the draft. However, if the size exceeds this size, the draft is no longer sufficiently strong to transport these particles with it. These particles will fall back towards the melt.

Preferably, the heat exchange system for pre-heating mineral material comprises a first pre-heater cyclone, a conduit for transporting exhaust gases from the circulating combustion chamber to the first pre-heater cyclone, a material inlet for injecting the mineral material into the conduit, and a flow communication from the first pre-heater cyclone to the circulating combustion chamber for feeding pre-heated mineral material to said combustion chamber.

Moreover, according to the preferred embodiment of the invention, the heat exchange system additionally comprises a second pre-heater cyclone, a second conduit from the first pre-heater cyclone to the second pre-heater cyclone for transporting the exhaust gases, and a mineral material inlet for injecting the mineral material into the second conduit, wherein the mineral material conduit leads from the second pre-heater cyclone to the first conduit. The preheating of the mineral material is in the range of 400-900° C., preferably 450-600° C. Preferably, the apparatus further comprises a multi cyclone, a third conduit from the second pre-heater cyclone for transporting exhaust gases to the multi cyclone, and a conduit for supplying separated material from the multi cyclone to the outlet of the first pre-heater cyclone. This may improve the energy efficiency, it is preferred that at least a portion of the mineral material is initially heated in a second pre-heater cyclone prior to being introduced into the exhaust gases from the circulating combustion chamber in the first conduit.

In a preferred embodiment of the invention, the apparatus and method is used for making mineral fibres from the mineral melt by flowing the collected mineral melt through an outlet in the circulating combustion chamber to centrifugal fiberising apparatus and forming fibres.

BRIEF DESCRIPTION OF THE DRAWINGS

The invention is in the following described in more detail with reference to the accompanying drawings, in which.

DETAILED DESCRIPTION OF THE INVENTION

Figure 1:
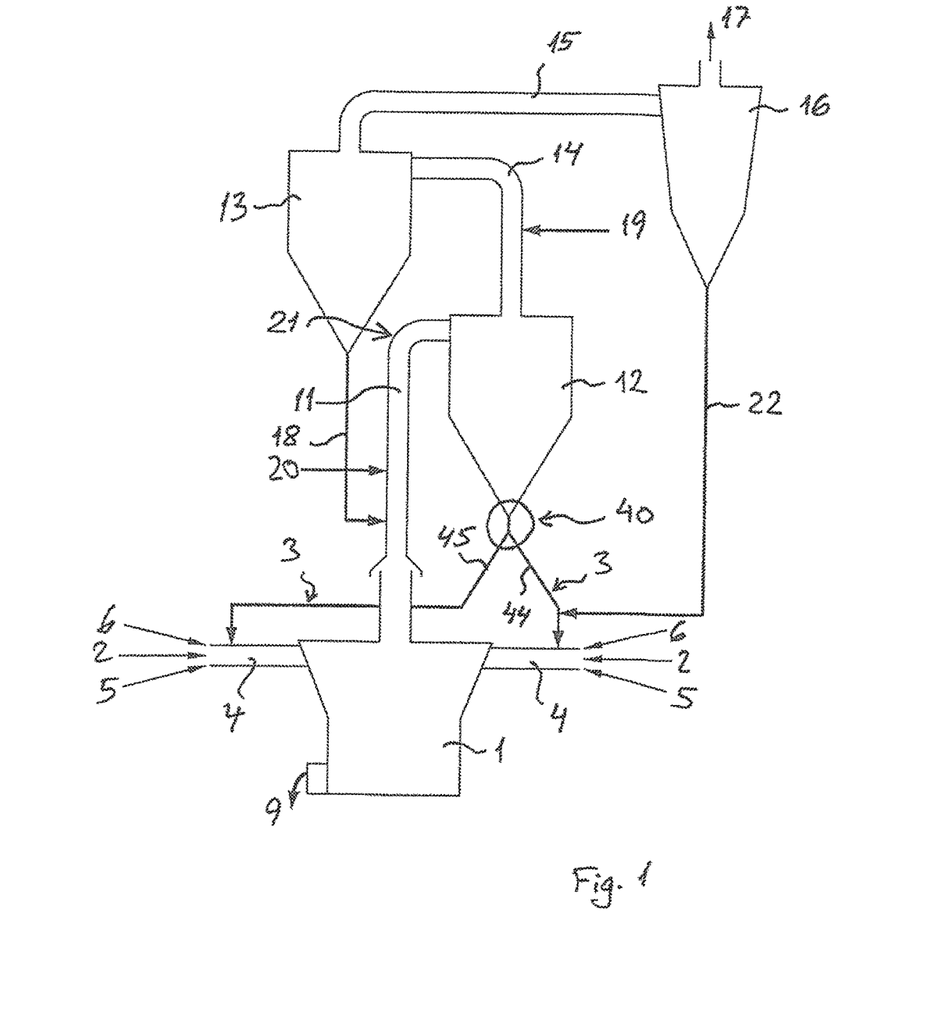
FIG. 1 is a schematic diagram of an apparatus according to a preferred embodiment of the present invention.

FIG. 1 shows a circulating combustion chamber 1 which comprises a cylindrical top section, a frustoconical bottom section and a cylindrical base section. Particulate fuel is introduced into the circulating combustion chamber from supply 2 and is preferably coal. Preheated mineral material is introduced into the circulating combustion chamber via a mineral material conduit 3. The coal and mineral material are introduced together with combustion air via conduit 4 and secondary air which is provided in compressed air supply 5 and is introduced through at least two tangential inlets such as a lance (not shown) into the circulating combustion chamber 1 to ensure thorough mixing of the coal 2 with the combustion air 6 and to sustain the circulating motion of the combustion gases and suspended material in the circulating combustion chamber 1. Secondary fuel, in this case natural gas may also be injected through supply (not shown) into the base section of the circulating combustion chamber 1.

The coal 2 is combusted in the combustion gas 6, which is preferably oxygen-enriched air 5, in the circulating combustion chamber 1. The resultant melt 9 is collected in the base zone of the circulating combustion chamber 1 and exits the chamber via an outlet. The exhaust gases are fed through the flue 10 at the top of the circulating combustion chamber 1 to the first conduit 11 where they are used to heat the granular mineral materials about to be fed into the circulating combustion chamber 1. The exhaust gases are then led to a first pre-heater cyclone 12 where they are separated from the mineral materials which are at this point mixed together. The exhaust gases flow from the first pre-heater cyclone 12 to the second pre-heater cyclone 13 via a second conduit 14. Following the second pre-heater cyclone 13 the exhaust gases flow through conduit 15 to a dust cyclone 16 and into a further treatment 17 where indirect heat exchange with the combustion gas occurs to preheat the combustion gas. The exhaust gases are then treated to make them safe to pass to the atmosphere such as by filter (not shown).

The mineral materials are preheated prior to being added to the circulating combustion chamber 1. In detail, a first mineral material which is typically a raw stone material is supplied from supply 19 to second conduit 14 and undergoes initial preheating in second pre-heater cyclone 13. The first mineral material is then passed through first mineral material conduit 18 and introduced into first conduit 11 and subsequently passes to the first pre-heater cyclone 12. The second mineral material is provided from supply 20 to the first conduit 11 downstream of the first mineral material. The second mineral material is generally a processed mineral material typically bonded mineral fibres, such as recycled mineral fibres. To ensure that NOx reducing conditions are generated in the first pre-heater cyclone 12, nitrogenous materials such as ammonia can be added at position 21 into the first conduit 11 immediately before the first pre-heater cyclone 12. Some of the first mineral materials may be carried up with the exhaust gases from the second pre-heater cyclone 13 through conduit 15. These are separated from the exhaust gases in dust cyclone 16 and recycled back to join the preheated mineral materials via conduit 22.

The exhaust gases leave the circulating combustion chamber 1 via the flue 10. The exhaust gases enter the first conduit 11 and are quenched from a temperature of between 1500 and 1900° C., usually around 1650° C. to a temperature of between 1000 and 1500° C. normally around 1300° C. by quenching air 31. The first mineral material is introduced into the first conduit 11 via inlet downstream of the second mineral material which is introduced into the first conduit 11 via the conduit 18.

The chamber is generally a vertical rather than a horizontal furnace. It normally has a cylindrical top section into which the fuel, mineral material and combustion gas are injected, a frustoconical bottom section and a base section in which the melt can be collected. Alternatively the chamber can be wholly cylindrical. The base section is preferably an integral part of the chamber and can be simply the end part of the frustoconical bottom region or can be a cylindrical section at the end of the bottom region. Preferably the diameter of the base section is not larger than the diameter of the top section in contrast to traditional systems which often employ a tank at the base of the chamber of enhanced volume.

The base section has an outlet for the mineral melt through which the melt passes as a stream. This stream can then be subjected to fiberisation in any conventional manner, for instance using a cascade spinner or a spinning cup or any other conventional centrifugal fiberising process. Alternatively, the mineral melt can be used in other industrial processes.

It is preferred that, at the point at which the outlet for mineral melt leaves the base section of the chamber, it does not immediately extend down but, instead, the outlet is a siphon. By "a siphon" we mean that the outlet, which is usually a tube or guttering, initially has an upward orientation relative to the opening in the chamber and subsequently has a downward orientation before leading to the fiberising equipment. This is advantageous for the melt quality as any unburnt fuel particles on the surface of the melt are kept inside the chamber.

Fuel is injected into the circulating combustion chamber. Any combustible fuel can be used. The fuel can be gaseous at room temperature, such as butane, propane, methane or natural gas, but is preferably a liquid or solid material. The fuel is preferably in particulate form and is most preferably a particulate carbonaceous material.

Where the fuel is a liquid, it is used in the form of droplets, i.e. particles of liquid fuel. In this embodiment, the fuel can be particles of petroleum oil or other carbon based liquids. However, the particulate fuel in the present invention is preferably solid. It is generally a carbonaceous material and can be any particulate carbonaceous material that has a suitable calorific value. The calorific value can be relatively low, for instance as low as 10000 kJ/kg or even as low as 5000 kJ/kg. Thus it may be, for instance, dried sewage sludge or paper waste. Preferably it has higher calorific value and may be spent pot liner from the aluminium industry, coal containing waste such as coal tailings, or powdered coal.

In a preferred embodiment, the fuel is powdered coal and may be coal fines but preferably some, and usually at least 50% and preferably at least 80% and usually all of the coal is made by milling lump coal, for instance using a ball mill. The coal, whether it is supplied initially as fines or lump, may be good quality coal or may be waste coal containing a high inorganic content, for instance 5 to 50% inorganic content. Preferably the coal is mainly or wholly good quality coal for instance bituminous or sub-bituminous coal (ASTM D388 1984) and contains volatiles which promote ignition.

The fuel particles preferably have a particle size in the range from 50 to 1000 μm, preferably about 50 to 200 μm. Generally at least 90% of the particles (by weight) are in this range. The average is generally about 70 μm average size, with the range being 90% below 100 μm. The fuel can be fed into the chamber through a feed pipe in a conventional manner to give a stream of fuel particles. This normally involves the use of a carrier gas in which the fuel particles are suspended. The carrier gas can be air, oxygen-enriched air or pure oxygen (preferably at ambient temperature to avoid flashbacks) or a less reactive gas such as nitrogen. The carrier gas is considered to be part of the combustion gas.

At least some and preferably the majority of the fuel is injected into the top section of the circulating combustion chamber. However, in preferred embodiments some fuel, termed secondary fuel, is also injected into the bottom section of the circulating combustion chamber.

Combustion gas is also introduced into the top section of the chamber through a plurality of tangentially arranged inlets and can be at ambient temperature, but is preferably preheated. The temperature of the pre-heated primary combustion gas is often determined by the heat available in the system. Often the combustion gas is pre-heated to is around 600° C., and it should at least be pre-heated to between 300 and 600° C., for instance to around 500 to 550° C. The combustion gas can be air or can be oxygen-enriched air. By "oxygen-enriched air" we mean that the gas contains more oxygen than is naturally present in air and can, in addition, contain other gases that are naturally present in air. It can also contain other gases that are not normally present in air, such as propane or methane, providing the total level of oxygen remains over that normally present in air.

In the preferred embodiment the combustion gas is oxygen-enriched air which comprises 25% to 50%, preferably 25% to 35%, oxygen by volume. In an alternative embodiment the combustion gas comprises at least 50% or at least 70% oxygen by volume or even pure oxygen. Throughout the description and claims by "pure oxygen" we mean oxygen of 92% purity or more obtained by, e.g. the vacuum pressure swing absorption technique (VPSA) or it may be almost 100% pure oxygen obtained by a distillation method. Using oxygen-enriched air is advantageous as it reduces the total volume of combustion gas needed. This means that a smaller circulating combustion chamber can be used than when air is used. As both the size of the chamber and the volume of the combustion gas are correlated with the energy needed to produce mineral fibres and the subsequent energy loss, this embodiment results in systems with higher energy efficiency. This has significant benefits in terms of increased economic viability and reduced environmental impact. Where pure oxygen is used it is preferably at ambient temperature, rather than being preheated.

The combustion gas may be introduced through a feed pipe with the fuel suspended in it, especially when the gas is at a relatively low temperature. The fuel should not begin to combust in the fuel pipe before it enters the chamber (a phenomenon known as "flash back") so low gas temperatures are needed in this embodiment. However, the combustion gas is preferably introduced separately through one or more combustion gas inlets which can be located in the vicinity of the fuel feed pipe so that the combustion gas is directed into the chamber in the same region as the fuel, to allow for efficient mixing.

Whether or not they are introduced together, the speed at which the combustion gas is injected into the chamber is relatively low (preferably between 1 and 50 m/s), so as to minimise wear of the apparatus. When the fuel and mineral material are suspended in the combustion gas, the speed is preferably between 5 and 40 m/s. When they are introduced separately, which is preferred, the injection speed of the fuel is preferably 20 to 40 m/s.

It is desirable to ensure that the preheated fuel is mixed rapidly and thoroughly with the combustion gas as this ensures that the fuel is ignited rapidly so that it can undergo pyrolysis, the initial stage of burning, almost immediately after introduction into the chamber. Having thorough mixing also ensures that the residence time of the fuel particles in the primary combustion gas is more uniform thereby leading to more efficient fuel combustion.

To help ensure rapid and thorough mixing an additional gas can be introduced in the top section of the circulating combustion chamber which travels at a higher speed than the combustion gas and the particulate fuel and, due to the speed differential, causes turbulence of the stream of fuel particles thereby breaking up the stream and ensuring rapid mixing. The additional gas is generally much less voluminous than the combustion gas and typically makes up less than 20% of the total gas injected into the combustion chamber, preferably between 5 and 15%. The additional gas can be any gas including air, nitrogen, oxygen, or a flammable gas such as propane or butane. The additional gas may be injected from an inlet so that it is adjacent the stream of fuel particles in the chamber but is preferably injected to an inlet that concentrically surrounds the fuel inlet. This concentric arrangement leads to efficient mixing, particularly where the additional gas inlet has a converging nozzle at its opening. The additional gas is preferably travelling at least 100 m/s faster than the fuel and the combustion gas, usually at least 250 m/s, preferably at least 300 m/s. In the most preferred embodiment, the injection speed of the additional gas is sonic, i.e. at or above the speed of sound.

In addition to the combustion gas that is injected into the top section of the circulating combustion chamber, it is also possible to inject some combustion gas into the bottom section. This can be termed secondary combustion gas. As with the main combustion gas, the secondary combustion gas can be at ambient temperature or preheated and preferably contains at least 25% oxygen. The secondary combustion gas can be oxygen enriched air which comprises at least 30% or 35%, preferably at least 50%, most preferably at least 70% oxygen by volume, or between 30 and 50% oxygen or pure oxygen. The secondary combustion gas can be introduced in any conventional manner but is preferably introduced using an inlet which has a converging nozzle, otherwise known as a lance.

The secondary combustion gas can be injected from one inlet in the lower section but is preferably injected from at least two, most preferably more than two such as three, four, five or six, preferably four inlets.

It is found that adding combustion gas in the bottom section of the circulating combustion chamber is very effective at ensuring full burn-out of the fuel particles. Adding oxygen at this point has been found to be much more effective than simply adding additional oxygen with the primary combustion air in the upper section. The secondary combustion gas can make up less than half of the total combustion gas which includes the main combustion gas, secondary combustion gas and any additional gas that is introduced which is combustible.

The secondary combustion gas may make up between 10 to 50%, preferably 20 to 40% of the total percentage of combustion gas. In one embodiment, an additional (or secondary) solid, liquid or gaseous fuel is injected into the bottom section, and burns in the presence of the secondary combustion gas to form a flame in the bottom section. This is particularly important when oxygen-enriched air is used as the combustion gas as although the lower volumes needed advantageous increase energy efficiency. The relative amounts of the oxygen in the secondary combustion gas and the secondary fuel are selected so that there is an excess of oxygen following complete combustion of the secondary fuel in the secondary gas. Injecting secondary fuel into the bottom section is advantageous as it can be used to regulate the temperature of the melt which has collected in the base section.

Forming a flame in the bottom section in addition to the main combustion in the top section is advantageous as it is a mechanism by which the melt temperature can be changed. In particular, in the base section of the circulating combustion chamber the mineral melt flows down the walls to be collected in the base section. Hence, in this region the melt is present as a thin film on the walls of the chamber and as a bath in the base section, which is normally shallow. Applying radiant heat in this area is particularly effective as it can penetrate the whole of the melt easily. Therefore, using a flame in this region is particularly effective at heating the melt homogeneously, rapidly and within accurate parameters so by varying the flow rate of the fuel and gas in this region, the temperature of the melt can be maintained within precise limits.

As this is the purpose, the secondary fuel is preferably injected towards the lower end of the bottom section, preferably in the lower half of the frustoconical bottom section of the chamber, so that it is close to the base section. The secondary fuel can be any fuel. In one embodiment the secondary fuel comprises solely solid fuel like particulate carbonaceous materials such as coal as these are generally very cost effective and can reduce the production of NOx. In another embodiment the secondary fuel includes some liquid or gaseous fuel that combusts immediately and completely. Preferably the secondary fuel includes some solid fuel, such as coal, in amounts such as 10 to 90%, preferably 40 to 80%, most preferably 50 to 70% of the total secondary fuel, where the remainder of the secondary fuel is liquid or gaseous fuel. Preferred non-solid fuels are propane, methane or natural gas. The secondary fuel is present in a lower amount than the particulate fuel and makes up less than 50%, typically 20 to 40% of the total fuel energy.

In this embodiment the secondary combustion gas is preferably pure oxygen and is introduced through a burner inlet with the fuel so that combustion occurs immediately. Alternatively, the secondary combustion gas can be introduced through an inlet close to the inlet for the secondary fuel and mixing can take place in the chamber.

The general motion of gases and suspended particulate material in the circulating combustion chamber is a cyclone motion. This is created by introduction of the combustion gas, as well as particulate fuel and mineral material, at an appropriate angle to sustain the swirling motion. When used, the secondary combustion gas is also preferably introduced in the same direction so as to sustain the circulating currents. The exhaust gases become separated from the mineral melt which is collected in the base of the chamber, and are passed to a heat exchange system, usually via a flue in the top of the circulating combustion chamber. The exhaust gases are then used to preheat the mineral material and optionally also the combustion gas. The exhaust gases typically leave the circulating combustion chamber at a temperature of between 1300 and 1900° C., usually 1500 to 1750° C., such as around 1550 to 1650° C.

In a preferred embodiment the first and second mineral materials are provided separately to the heat exchange system. This is advantageous when the first mineral material has a higher sintering temperature than the second mineral material. The first mineral material is typically a raw mineral material with a sintering temperature of 1200 to 1400° C. whereas the second mineral material is typically a processed mineral material, such as bonded mineral fibres, which have a sintering temperature of 900 to 1100° C. To achieve maximum energy efficiency it is very important that the heat energy of the exhaust gases is utilised as fully as possible. It is also important for heat efficiency and to maintain good flow characteristics of the mineral material and hence good process efficiency that the mineral materials are not melted or softened during the preheating. This is dealt with by preheating the first mineral material prior to the second mineral material. In particular, the first mineral material is added to the heat exchange system prior to the second mineral material. By this is meant that the first mineral material is added upstream in the exhaust gases of the second mineral material. After contact with the first mineral material, the first mineral material is preheated and the exhaust gases are cooled and go on with the preheated first mineral material to preheat the second mineral material. It is usual to quench the exhaust gases before contact with the first mineral material. Typically the exhaust gases are quenched to around 1300° C. to avoid softening or melting the first mineral material. The quenching is carried out with any suitable gas such as air or any suitable liquid such as ammonia.

When the exhaust gases contact the first mineral material they preheat it and are themselves cooled. In a first preheating stage the first mineral material is preferably preheated to a temperature of from 300 to 600° C., more preferably 400 to 550° C. Preferably the relative amounts of exhaust gases and first mineral material are such that the first mineral material is preheated by the end of the second preheating stage to slightly below the sintering temperature of the second mineral material, usually 750 to 850° C.

The second mineral material is subsequently added to the heat exchange system and contacts the exhaust gases and first mineral material which is suspended in the exhaust gases. The second mineral material is preheated through this contact. Preferably the second mineral material is preheated to at least 700° C. and preferably to between 750 and 850° C.

Often the second mineral material is a processed product which includes organic agents such as organic binders. It is particularly advantageous to preheat the second mineral material to a temperature at which and conditions under which the organic additives are completely combusted. Therefore, the gas comprising released organic components should be heated to around 750 to 850° C. for at least 1 to 2 seconds under atmospheric conditions which contain at least 2% oxygen to burn off the organic binder.

The heat exchange system preferably comprises at least one and preferably two or even three pre-heater cyclones 12, 13, 16. The first and second mineral materials are typically added to a first conduit 11 which transports exhaust gases from the circulating combustion chamber 1 to the first pre-heater cyclone 12. In the first pre-heater cyclone 12, the exhaust gases are separated from the mineral material. The mineral material, which comprises the first and second mineral materials mixed, is passed through mixed mineral material conduits 3 to the inlets of the circulating combustion chamber 1 to be melted.

Preferably nitrogen oxide (NOx) reducing conditions are generated in the first pre-heater cyclone 12. NOx is an environmental effluent that must be removed from the exhaust gases before they can be released into the atmosphere. This is normally carried out by selective non-catalytic reduction (SNCR). However, advantageously in the present invention NOx can be significantly reduced and preferably substantially eliminated in the first pre-heater cyclone by selective non-catalytic reduction (SNCR). This is an economic and convenient way to remove NOx from the exhaust gases.

The NOx reducing conditions are generated by including in the pre-heater cyclone nitrogenous material which will reduce NOx under the conditions prevailing in the pre-heater cyclone 12. The nitrogenous material may be included in the hot exhaust gas which is fed to the pre-heater cyclone 12 or may be added direct to the pre-heater cyclone 12.

The nitrogenous material which is included in the pre-heater cyclone is preferably ammonia or ammonium compound, an amine or urea, wherein the urea may be free or, more preferably, is a resinous product such as a urea formaldehyde or phenol urea formaldehyde resin. It is particularly preferred that the NOx reducing conditions are generated by including in the mineral material waste bonded mineral wool as the second mineral material which is fed to the pre-heater cyclone 12, wherein the waste bonded mineral wool contains a urea resin (usually phenol urea resin) and/or ammonia or an ammonium compound (for instance as a buffering agent for resin in the waste wool). Thus, it is possible simultaneously to utilise waste material and to react it under appropriate conditions so as to reduce a significant amount of the NOx in the exhaust gases to nitrogen.

The amount of ammonia or ammonia derivative or other NOx-reducing compound is preferably 1 to 4 (preferably 1-2 or, especially, 1-1.7) moles per mole NOx and the reaction is preferably conducted at a temperature of 800° C. to 1050° C. The reaction residence time is preferably at least 0.3 seconds and most preferably at least 1 second. Typically this can be the residence time of the particulate mineral material in the pre-heater cyclone, and/or the ducting, until the exhaust gas is cooled below reaction temperature, e.g., below 800° C. Under these conditions, preferably with a temperature in the range 800 to 1050° C., substantially all the NOx is reduced to nitrogen, even though the atmosphere in the pre-heater cyclone is preferably oxidising.

Thus, according to another preferred feature the gaseous atmosphere in the pre-heater cyclone contains excess oxygen, preferably in an amount of at least 1% or 2%, but it can be up to 4%, or even up to 12% by volume by weight of the gaseous atmosphere. Despite the oxidising nature of the atmosphere, NOx is reduced by the added ammonia or other nitrogenous compound under the conditions defined for the pre-heater.

The pre-heater can thus simultaneously operate as a NOx reducer and an oxidising after-burner to burn pollutants such as hydrogen sulphide and carbon monoxide from the circulating combustion chamber. Preferably the exhaust gases which are separated from the melt and which are then fed to the pre-heater cyclone contain less oxygen than the amount which is present in the pre-heater cyclone and so preferably air or other source of oxygen is added to the exhaust gases either in the pre-heater or between the melt and the pre-heater. The exhaust gases are passed from the top of the first pre-heater cyclone 12 through a second conduit 14 to a second pre-heater cyclone 13. It is preferred that the first mineral material undergoes initial preheating in the second pre-heater cyclone 13 before being conveyed to the first conduit 11 to be further preheated by the exhaust gases. Hence, in a preferred embodiment the first mineral material is introduced into the second conduit and is preheated to an initial temperature of between 300 and 600° C., preferably to between 450 and 550° C. The exhaust gases then leave the second pre-heater cyclone 13 and are often used to heat the combustion gas by indirect heat exchange.

Figure 2:
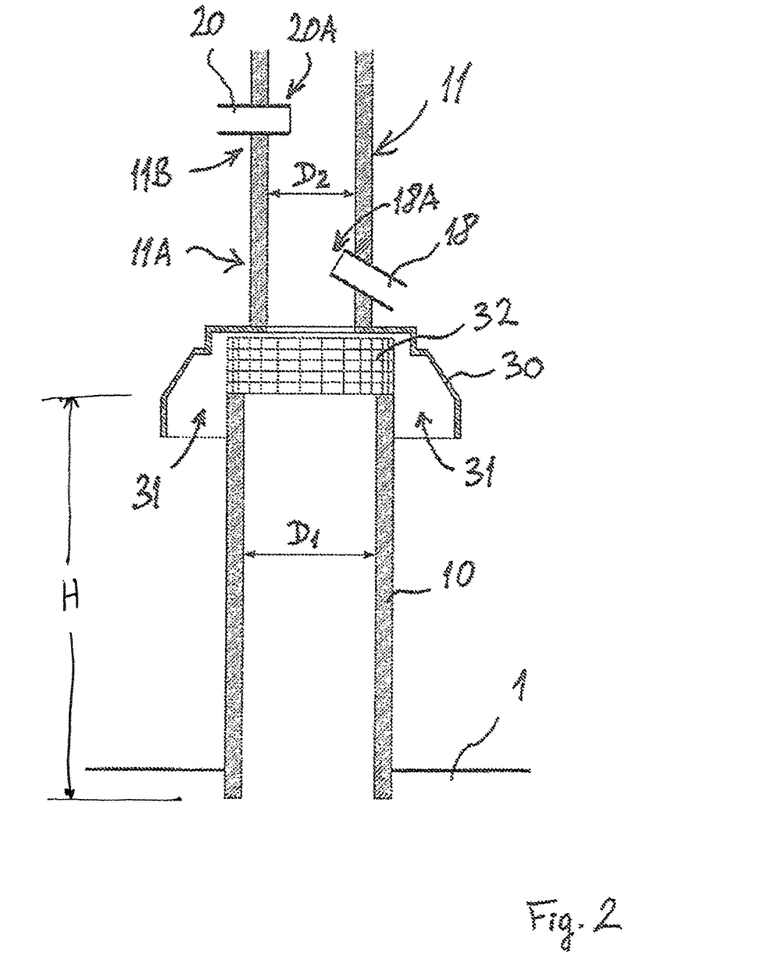
FIG. 2 is a detailed schematic side view of the quenching air arrangement of exhaust gases flue at the top of the circulating combustion chamber.

As mentioned above, the exhaust gases are quenched before contact with the first mineral material. Typically the exhaust gases are quenched to around 1300° C. to avoid softening or melting the first mineral material. The quenching is carried out with any suitable gas such as air or any suitable liquid such as ammonia. With reference to FIG. 2, the quenching is performed by transporting the exhaust gases from the circulating combustion chamber 1 through an exhaust pipe 10 and into a quenching hood 30 from below. The quenching hood 30 is at its top connected to the conduit 11. The exhaust pipe 10, the quenching hood 30 and the conduit 11 are preferably concentrically arranged.

The quenching hood 30 quenches the exhaust gases before entering the conduit 11 by drafting a cooling fluid, such as ambient air, into the flow of exhaust gases around the outlet of the exhaust pipe 10. In the embodiment shown in FIG. 2, the quenching hood 30 comprises an annular air intake opening 31 around the exhaust pipe 10. Ambient air is drawn through this annular air intake and into the hood 30 due to the fast exhaust gas flow in the exhaust pipe 10 and into the conduit 11.

Preferably, the exhaust pipe 10 has a larger diameter ($D_1$) than the diameter ($D_2$) of the conduit 11. This may be advantageous since any residues forming on the inner surface of the conduit 11 may fall into the melt and not outside the furnace 1. In the upwardly directed exhaust gas draft the light materials and droplets until a certain size will be suspended in the draft. However, if the size exceeds this size, the draft is no longer sufficiently strong to transport these particles upwards with it. These particles may fall back towards the melt inside the conduit 11 and the exhaust pipe 10 or form droplets on the inner surfaces thereof.

In order to prevent larger particulates of material from exiting the system, the exhaust pipe 10 may be screened by a perforated screening element 32 where the exhaust gases exit the pipe 10. This screen 32 may be made from a perforated plate having openings of approx. 20×20 mm in size. The opening area of the screen 32 may be approx. 50%. Hereby, the screen 32 may not only retain any larger particles which are thrown up from the melt in the furnace 1 from being discharged through the quenching, but does also prevent pre-heated raw material particles 18 which are introduced into the conduit 11 above the quenching hood from falling out of the system, but rather into the melting furnace.

As shown in FIG. 2, the pre-heated raw mineral material from the second pre-heater cyclone 13 is introduced through the supply 18 into the quenched but nevertheless hot exhaust gases in the conduit 11 for further pre-heating. Downstream in the conduit, the optional material supply 20 of bonded waste mineral wool is provided.

As shown in FIG. 2, the inlets for the supply of raw materials 18 and waste bonded mineral wool 20 preferably extend into the conduit 11. These tubular inlet extensions 18A and 20A ensure that the material is fed into the main part of the air stream. Thereby material avoids the boundary layer with lower flow, which otherwise may result in material falling down in stead of being carried by the air flow.

The inlet extension 18A for the pre-heated raw material 18 is preferably provided in the lowermost section 11A of the conduit 11 which is water cooled. The inlet 18A has an angular orientation to the air flow direction in the conduit 11 different than perpendicular so that the material is introduced with a flow direction less than 90° relative to the hot exhaust gas flow, preferably between 15° and 75°, e.g. approx. 60° to facilitate the introduction of the raw material into the air flow. Accordingly, at least the lowermost portion of this tubular inlet 18A may extend into the conduit 11, e.g. at a distance of 15-30% of the inner conduit diameter $D_2$.

The inlet extension 20A for the supply of waste bonded material wool 20 is provided upstream the raw material inlet 18A in the second section 11B of the conduit 11, which is preferably provided with a ceramic lining. In the shown embodiment, the waste material inlet 20A is perpendicular to the conduit 11. It is of course realised that the inlet 20A could also be provided with an acute angle to the air flow. The waste material wool inlet 20A may in an embodiment be extended into the conduit 11 at a distance of 15-30% of the inner conduit diameter $D_2$.

According to the invention, the exhaust pipe 10 extends upwards from the combustion chamber at a height H of at least 2.5 times, e.g. between 2.5 and 4, preferably approximately three times the inner diameter $D_1$ of the exhaust pipe 10 and into the quenching hood 30 so that the exhaust gases exits the outlet inside the hood 30. The diameter $D_1$ may be approx. 850 mm and the height of the exhaust pipe 10 may be approx. 2700 mm. The inner diameter $D_2$ of the conduit may be in the order of 630 mm. The supply openings 18 and 20 may be tubes with an inner diameter of approx. 200 mm in diameter.

This height/inner diameter ratio of the exhaust pipe 10 ensures that many of the droplets and fines from the hot exhaust gas are thrown onto the wall of the exhaust pipe 10 and returned to the melting cyclone 1. When melting fine mineral materials, this is found advantageous due to the amount of droplets and fines leaving with the exhaust gases.

The exhaust pipe 10 may be water cooled with a lining of ceramic material and covered on the inside with a layer of frozen melt. Similarly, the conduit 11 may be water cooled and/or provided with a ceramic lining in order to ensure that the conduit 11 and the exhaust pipe 10 can withstand the high temperatures to which they are exposed.

By this extended exhaust pipe, the light material is kept within the exhaust pipe 10 for a longer time. The hot exhaust gases are circulating due to the vortex in the cyclone furnace 1 and therefore a major part of the light material in the exhaust gases are thrown onto the inner surface of the exhaust pipe 10 as melt and runs down as droplets on the inside of the exhaust pipe surface and down into the melting cyclone 1. Since the material hereby is re-introduced as a melt and not re-introduced as light material into the exhaust gases it is thrown onto the walls in the melting furnace 1 to become part of the melt 9 produced therein.

Above, the invention is described with reference to a preferred embodiment. However, it is realised that other variants may be provided without departing from the scope of protection as defined in the accompanying claims.

The invention claimed is:

1. An apparatus for the production of a mineral melt by burning a combustible material in the presence of inorganic particulate material and thereby forming the melt, said apparatus comprising:
   a circulating combustion chamber;
   an exhaust pipe extending upwards from the circulating combustion chamber, the exhaust pipe having an inner diameter and a height, the height being at least 2.5 times the inner diameter;
   a quenching hood disposed such that the exhaust pipe extends upwards into the quenching hood to define an annular air intake opening around the exhaust pipe; and
   a heat exchange system having a first conduit and a first pre-heater cyclone, the first conduit connected to the quenching hood for transporting exhaust gases to the first pre-heater cyclone, wherein the inner diameter of said exhaust pipe is larger than an inner diameter of said first conduit.

2. An apparatus according to claim 1, further comprising a perforated screening element on the exhaust pipe.

3. An apparatus according to claim 1, wherein the heat exchange system comprises the first conduit, a material inlet in the first conduit, and a mineral material conduit extending from the first pre-heater cyclone to the circulating combustion chamber.

4. An apparatus according to claim 1, wherein the heat exchange system additionally has a second pre-heater cyclone, a second conduit extending from said first pre-heater cyclone to the second pre-heater cyclone, and a mineral material conduit extending from the second pre-heater cyclone to the first conduit.

5. An apparatus according to according to claim 4, wherein the apparatus further comprises a dust cyclone, a third conduit extending from the second pre-heater cyclone to the dust cyclone, and a conduit extending from the dust cyclone to an outlet of the first pre-heater cyclone.

6. An apparatus according to according to claim 1, wherein the apparatus is operable to pass the exhaust gases through the exhaust pipe and into the first conduit of the heat exchange system.

\* \* \* \* \*